United States Patent
Tanioku et al.

(10) Patent No.: US 10,926,726 B2
(45) Date of Patent: Feb. 23, 2021

(54) GRILLE PERIPHERAL STRUCTURE FOR VEHICLE AND METHOD FOR MANUFACTURING GRILLE PERIPHERAL STRUCTURE FOR VEHICLE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Ryota Tanioku, Kariya (JP); Satoshi Endo, Kariya (JP)

(73) Assignees: KABUSHIKI KAISHA TOYOTA JIDOSHOKKI, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 67 days.

(21) Appl. No.: 16/356,130

(22) Filed: Mar. 18, 2019

(65) Prior Publication Data

US 2019/0291672 A1 Sep. 26, 2019

(30) Foreign Application Priority Data

Mar. 20, 2018 (JP) .............. JP2018-052478

(51) Int. Cl.
| | | |
|---|---|---|
| *B60R 19/52* | (2006.01) | |
| *B60R 19/48* | (2006.01) | |
| *B62D 25/08* | (2006.01) | |
| *B60R 19/24* | (2006.01) | |
| *B62D 65/16* | (2006.01) | |

(52) U.S. Cl.
CPC .............. *B60R 19/52* (2013.01); *B60R 19/24* (2013.01); *B60R 19/48* (2013.01); *B62D 25/085* (2013.01); *B62D 65/16* (2013.01); *B60R 2019/486* (2013.01)

(58) Field of Classification Search
CPC ....... B60R 19/023; B60R 19/44; B60R 19/52; B62D 25/082; B62D 25/085; B62D 65/16
USPC ........................................ 296/193.1; 293/115
See application file for complete search history.

(56) References Cited

U.S. PATENT DOCUMENTS

| | | | | |
|---|---|---|---|---|
| 6,405,819 B1 * | 6/2002 | Ohkura | .................. | B60K 11/08 180/68.1 |
| 8,196,978 B2 * | 6/2012 | Shin | ..................... | B62D 25/084 293/115 |

FOREIGN PATENT DOCUMENTS

| | | | | |
|---|---|---|---|---|
| DE | 102008059322 B4 | * | 10/2019 | ............. B60R 19/52 |
| JP | 11034771 A | * | 2/1999 | |
| JP | 2004-196122 A | | 7/2004 | |

* cited by examiner

*Primary Examiner* — Jason S Daniels
(74) *Attorney, Agent, or Firm* — Sughrue Mion, PLLC

(57) ABSTRACT

An extension of a grille extends rearward and in a left-right direction of a vehicle. The extension is located rearward from a grille body and below a ventilation hole. An extension rear edge is arranged above a structure front upper edge. An extension front edge at which the grille body and the extension are connected to each other is arranged below the structure front upper edge. The extension is inclined from the extension front edge toward the extension rear edge. The extension includes weak portions that divide the extension into a plurality of sections in the left-right direction.

7 Claims, 6 Drawing Sheets

GRILLE PERIPHERAL STRUCTURE FOR VEHICLE AND METHOD FOR MANUFACTURING GRILLE PERIPHERAL STRUCTURE FOR VEHICLE

BACKGROUND

The present disclosure relates to a grille peripheral structure for a vehicle and a method for manufacturing a grille peripheral structure for a vehicle.

Conventionally, a bumper made of an elastic body is coupled to the front end of a vehicle. If the front end of the vehicle collides with a pedestrian or the like, the bumper and its periphery is deformed or moved rearward. This buffers the impact on the hit pedestrian. The bumper includes a relatively large grille hole into which airstream due to relative wind on a radiator that cools the engine coolant is drawn. A grille made of, for example, a plastic is fitted into the grille hole to improve the aesthetic appeal.

SUMMARY

It is an object of the present disclosure to provide a grille peripheral structure for a vehicle that further buffers the impact on a pedestrian or the like that collides with a vehicle when a front end of the vehicle collides with the pedestrian and a method for manufacturing a grille peripheral structure for a vehicle.

Examples of the present disclosure will now be described.

Example 1: A grille peripheral structure for a vehicle is provided. The grille peripheral structure includes a bumper arranged at a front end of the vehicle. The bumper has a grille hole that causes an exterior and an interior of the vehicle to communicate with each other and extends in a left-right direction of the vehicle. The grille peripheral structure also includes a grille fitted into the grille hole and a vehicle interior structure arranged rearward from the grille in the vehicle. The grille includes a grille body and an extension. The grille body extends in the left-right direction and is fitted into the grille hole. The grille body has a ventilation hole that causes the exterior and the interior of the vehicle to communicate with each other. The extension extends rearward and in the left-right direction. The extension is located rearward from the grille body and below the ventilation hole. An extension rear edge that is a rear edge of the extension is arranged above a structure front upper edge that is a front upper edge of the vehicle interior structure. An extension front edge that is a front edge of the extension and at which the grille body and the extension are connected to each other is arranged below the structure front upper edge. The extension is inclined from the extension front edge toward the extension rear edge. The extension includes weak portions that divide the extension into a plurality of sections in the left-right direction.

Example 2 is the grille peripheral structure according to example 1. The ventilation hole of the grille body is one of a plurality of ventilation holes arranged along the left-right direction. A pillar extending in a vertical direction of the vehicle is arranged between ones of the ventilation holes that are adjacent to each other in the left-right direction. The weak portions are located rearward from the pillars in the extension.

Example 3 is the grille peripheral structure according to example 1 or 2. The extension is bent or curved upward from the extension front edge toward the extension rear edge.

Example 4 is the grille peripheral structure according to any one of examples 1 to 3. The weak portions are configured by cutouts.

Example 5 is a grille for a vehicle. The grille is coupled to a bumper of the vehicle. A vehicle interior structure is arranged rearward from the grille in the vehicle. The grille includes a ventilation hole that causes an exterior and an interior of the vehicle to communicate with each other. The grille also includes an extension. When the interior of the vehicle is viewed from the exterior of the vehicle through the ventilation hole, the extension extends rearward so as to hide the interior of the vehicle. The extension extends upward from the vehicle interior structure.

Example 6 is the grille according to claim 5. The extension includes weak portions that divide the extension into a plurality of sections in a left-right direction of the vehicle.

Example 7 is a method for manufacturing a grille peripheral structure for a vehicle. A bumper is arranged at a front end of the vehicle. The bumper has a grille hole that causes an exterior and an interior of the vehicle to communicate with each other and extends in a left-right direction of the vehicle. The method includes providing a grille that includes a grille body and an extension and coupling the grille to the grille hole. The providing the grille includes extending the grille body in the left-right direction and arranging a ventilation hole in the grille body. The ventilation hole causes the exterior and the interior of the vehicle to communicate with each other. The providing the grille also includes extending the extension rearward and in the left-right direction, arranging the extension rearward from the grille body and below the ventilation hole, and inclining the extension from an extension front edge toward an extension rear edge. The extension front edge is a front edge of the extension and at which the grille body and the extension are connected to each other. The extension rear edge is a rear edge of the extension. The providing the grille further includes arranging weak portions in the extension. The weak portions divide the extension into a plurality of sections in the left-right direction. A vehicle interior structure is arranged rearward from the grille in the vehicle. The coupling the grille to the grille hole includes fitting the grille body into the grille hole, arranging the extension rear edge above a structure front upper edge that is a front upper edge of the vehicle interior structure, and arranging the extension front edge below the structure front upper edge.

In Example 1, the extension rear edge is arranged above the structure front upper edge, and the extension front edge is arranged below the structure front upper edge. This causes the extension to be inclined upward as the rear side of the vehicle becomes closer. When the grille is moved rearward, the extension does not strike the vehicle interior structure. When the inclined surface of the extension is moved to the rear side while keeping in contact with the structure front upper edge, the extension is deformed. Thus, when the grille is moved rearward, the striking of the extension on the vehicle interior structure is avoided. Accordingly, when the vehicle collides with a pedestrian or the like, the impact on the hit pedestrian can be further buffered.

When the vehicle collides with a pedestrian or the like, the impact on the hit pedestrian can be further buffered by increasing the amount in which the grille is moved rearward. In example 1, the extension is divided into multiple sections in the left-right direction by the weak portions. For example, when a larger impact is applied to portions of the grille, only the extension corresponding to the portions of the grille divided by the weak portions can be deformed to a large extent. Thus, only the portions of the grille can be moved rearward to a large extent. Such a structure is preferred because it is easier to deform only the small sections configured by dividing the extension than to deform the entire extension. Accordingly, when the vehicle collides with a pedestrian or the like, the impact on the hit pedestrian can be further buffered.

In example 2, the weak portions are arranged at the rear side of the pillars, which define the ventilation holes of the grille in the left-right direction. This causes the weak portions to be hidden by the rear of the pillars when the grille is viewed from the front side. This makes the weak portions unnoticeable and prevents the vehicle interior structure from being viewed from the vehicle outside through the weak portions. As a result, the aesthetic appeal of the vehicle is improved.

In example 3, the extension extending rearward can be formed into various shapes in accordance with the space or the like in the vehicle. Further, example 3 allows the inclination angle of the extension to be changed so that a portion of the extension located away from the ventilation holes is arranged further upward. This allows wind to be drawn in from the ventilation holes.

In example 4, the weak portions, which divide the extension into multiple sections in the left-right direction of the vehicle, are configured by cutouts. This structure allows the weak portions to be easily configured.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferable embodiments together with the accompanying drawings in which:

FIG. 1 is a diagram illustrating an example of the outer appearance of a bumper arranged at the front end of a vehicle, a grille fitted into a grille hole formed in the bumper, and the like;

DETAILED DESCRIPTION

Figure 1:
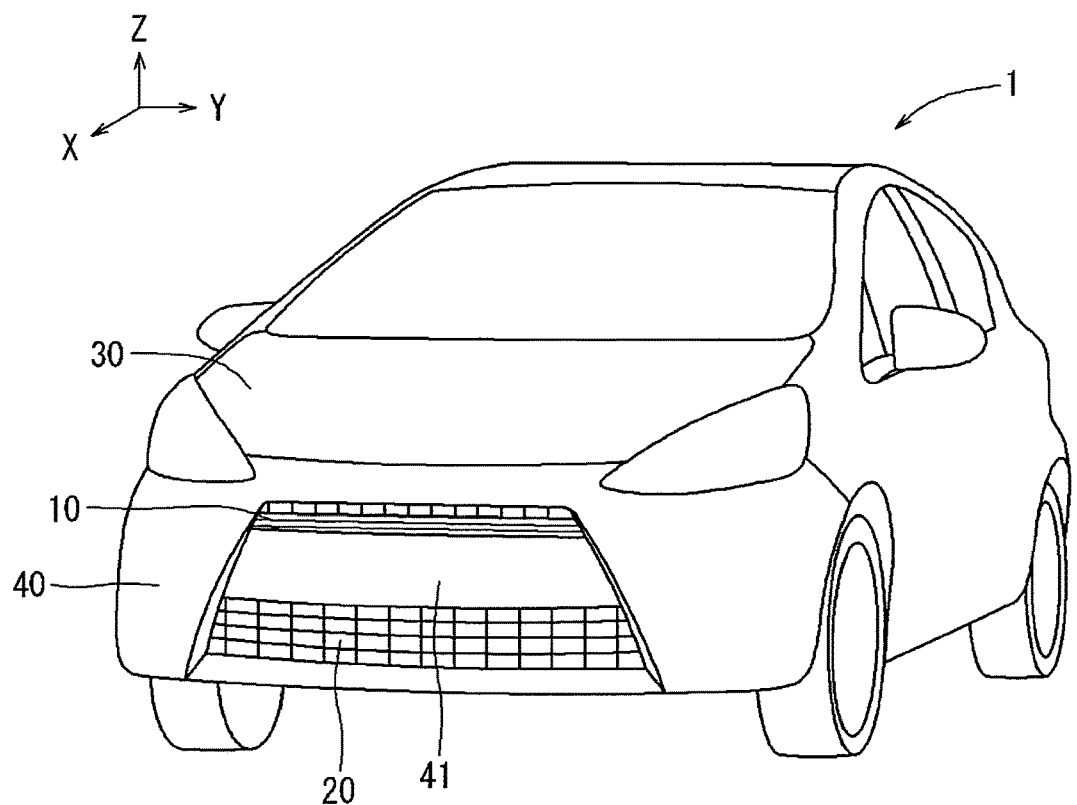

Outer Appearance of Grille Periphery of Vehicle and Positions of Bumper and Grille (FIG. 1)

FIG. 1 illustrates an example of the outer appearance of a general vehicle. In the drawing, the X-axis, Y-axis, and Z-axis are orthogonal to one another. The X-axis direction indicates the front direction of the vehicle, the Y-axis direction indicates the left direction of the vehicle, and the Z-axis direction indicates the vertically upward direction.

A bumper 40 made of, for example, an elastic body is coupled to the front end of a vehicle 1. A hood 30 is arranged above the bumper 40. The bumper 40 has a grille hole that extends in the left-right direction of the vehicle and causes the exterior and interior of the vehicle to communicate with each other. The grille hole is an opening into which airstream due to relative wind on a radiator that cools the engine coolant is drawn. In the example of the vehicle 1 illustrated in the present embodiment, the grille hole is divided into upper and lower sections by a grille partition 41 of the bumper 40. A grille 10 is fitted into the upper grille hole (grille hole 42 in FIG. 5), and a lower grille 20 is fitted into the lower grille hole.

Figure 11:
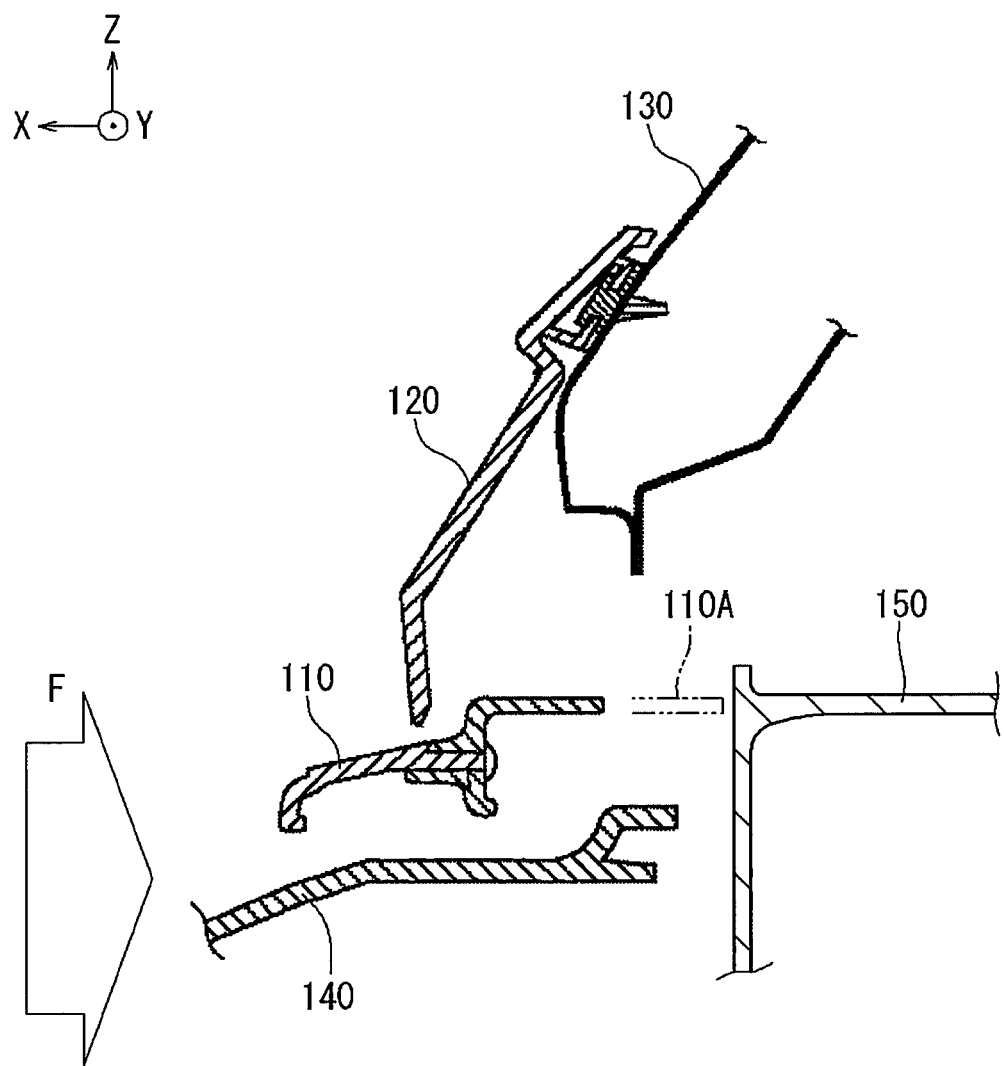
FIG. 11 is a cross-sectional view illustrating a grille peripheral structure for a vehicle in a comparative example, with the vehicle cut on an imaginary vertical plane extending in the front-to-rear direction of the vehicle.

FIG. 11 illustrates a grille peripheral structure in a comparative example. The grille peripheral structure shown in FIG. 11 includes, for example, a bumper 140 made of an elastic body, a first grille 110 coupled to the bumper 140 and made of a plastic or the like, a hood 130 made of a metal or the like, and a second grille 120 coupled to the hood 130 and made of a plastic or the like. The example of these structures is described in, for example, Japanese Laid-Open Patent Publication No. 2004-196122. In FIG. 11 illustrating the comparative example, a vehicle interior structure 150 (for example, reinforcement) made of a metal or the like is arranged rearward from the bumper 140 and the first grille 110 to protect the passenger compartment when a collision occurs. The first grille 110 extends rearward so that the vehicle interior such as the vehicle interior structure 150 is hidden from a ventilation window located in the vicinity of the second grille 120. FIG. 11 is a cross-sectional view in which the vehicle is cut on an imaginary vertical plane extending in the front-to-rear direction of the vehicle.

In the structure shown in FIG. 11, if the vehicle collides with a pedestrian or the like so that an impact force F is applied to the front end of the vehicle, the bumper 140 is deformed rearward. This buffers the impact on the pedestrian that has collided with the vehicle. If the front end of the vehicle collides with a pedestrian or the like so that the first grille 110 is moved rearward, the first grille 110 may strike the vehicle interior structure 150 (refer to 110A in FIG. 11). In order to further buffer the impact on the pedestrian that has collided with the vehicle, it is further preferred that the first grille 110 not strike the vehicle interior structure 150.

In the structure shown in FIG. 1, if the vehicle 1 collides with a pedestrian or the like, the bumper 40 made of an elastic body or the like is moved rearward. This buffers the impact on the hit pedestrian. It is further preferred that the grille peripheral structure in the present embodiment buffer impact to a greater extent than the first grille 110 of the grille peripheral structure in the comparative example illustrated in FIG. 11 because the impact on the pedestrian will be further buffered. The grille peripheral structure for the vehicle in the present embodiment, which further buffers the impact, will be hereinafter described using the grille 10 illustrated in FIGS. 1 to 10 as an example.

Entire Structure (FIGS. 2 to 4) and Grille Peripheral Structure (FIG. 5) of Grille 10

Figure 2:
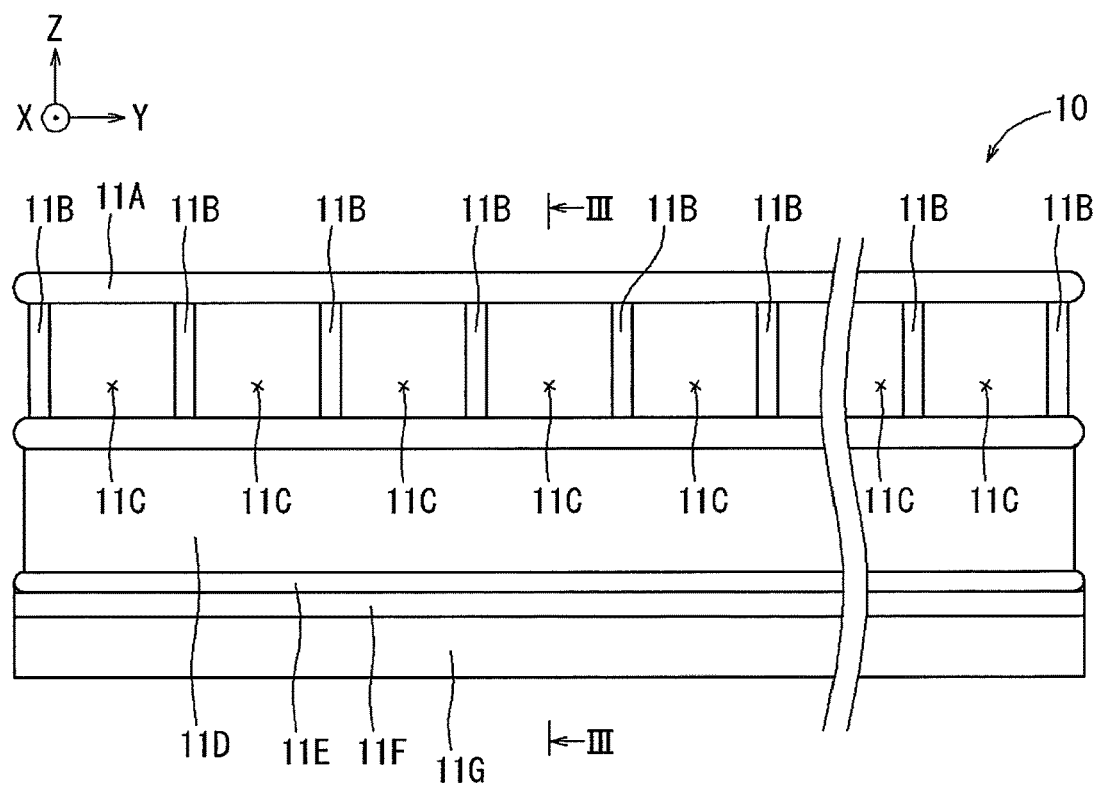
FIG. 2 is a front view of the grille in a grille peripheral structure for the vehicle in the present embodiment, illustrating the entire structure of the grille.
Figure 3:
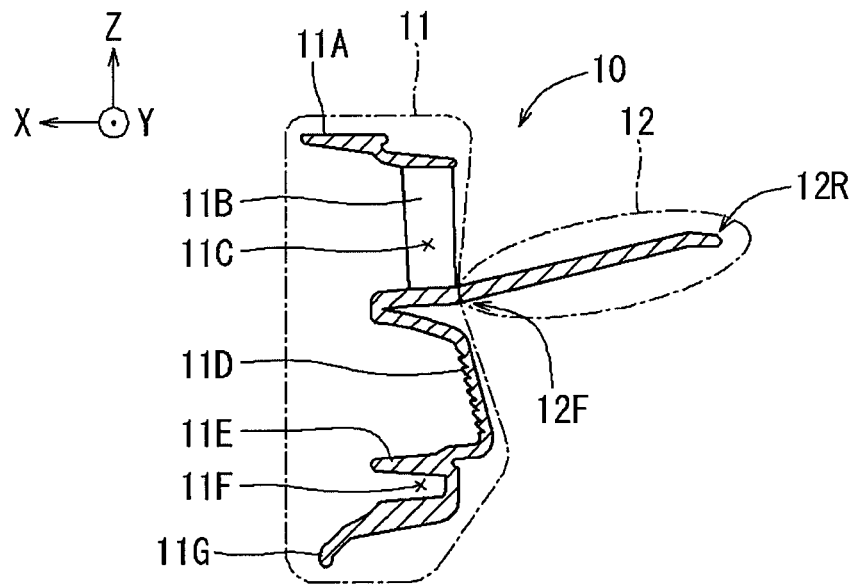
FIG. 3 is a cross-sectional view taken along line III-III in FIG. 2.
Figure 4:
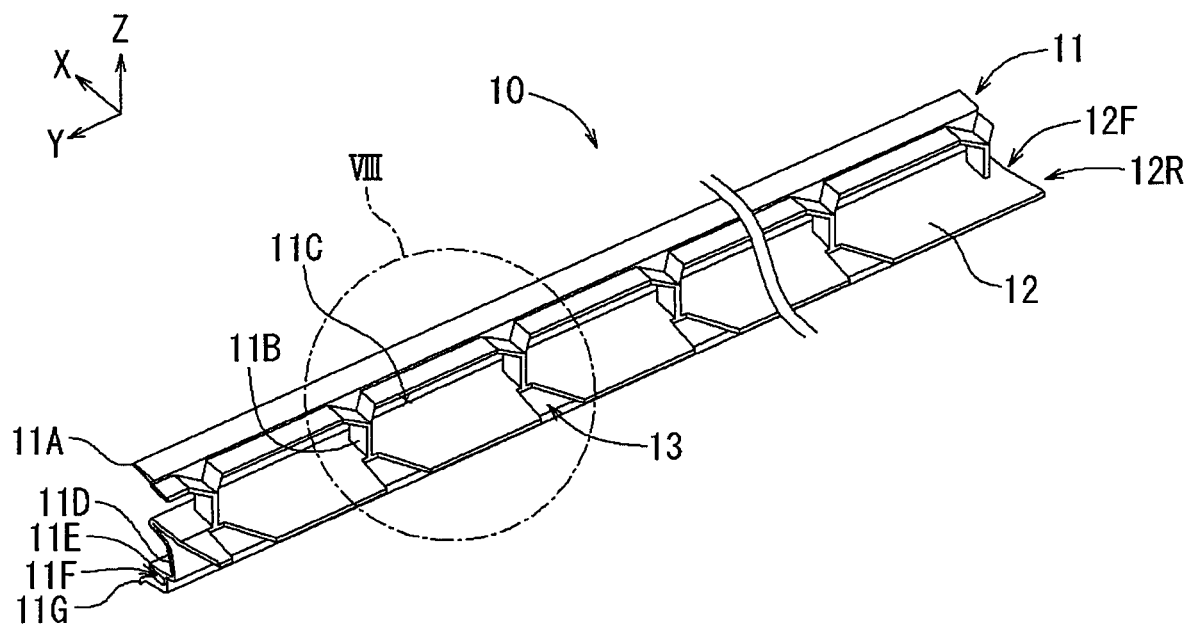
FIG. 4 is a perspective view of the grille shown in FIG. 2, illustrating the entire structure of the grille.
Figure 5:
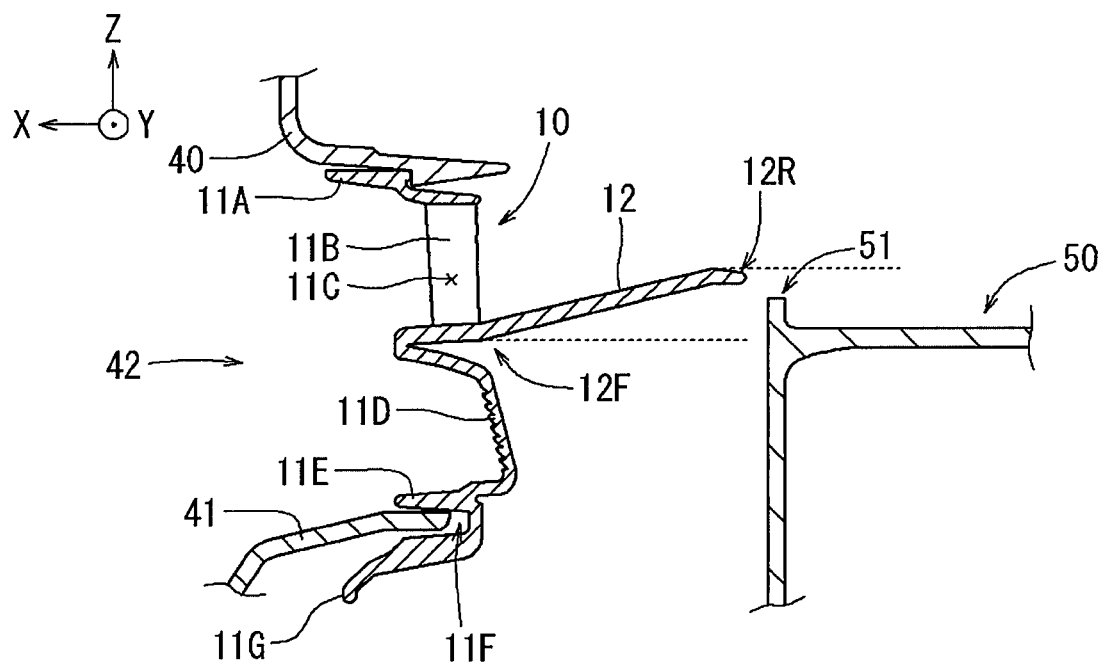
FIG. 5 is a cross-sectional view of the grille peripheral structure shown in FIG. 2, illustrating the arrangement of the bumper, the grille fitted into the grille hole of the bumper, and a vehicle interior structure arranged rearward from the grille in the vehicle, with the vehicle cut on an imaginary vertical plane extending in the front-to-rear direction of the vehicle.

FIG. 2 is a front view of the grille 10, FIG. 3 is a cross-sectional view taken along line III-III in FIG. 2, and FIG. 4 is a perspective view of the grille 10. FIG. 5 is a cross-sectional view of the grille peripheral structure in which the grille 10 is fitted into the grille hole 42, which is located above the grille partition 41 in the bumper 40, with the vehicle cut on an imaginary vertical plane extending in the front-to-rear direction. In the vehicle, a vehicle interior structure 50 is arranged rearward from the bumper 40 and the grille 10. For example, the vehicle interior structure 50 is a reinforcement, which is a metal frame. The vehicle interior structure 50 protects the passenger compartment when the vehicle collides with an object located outside the vehicle.

As shown in FIG. 3, the grille 10 includes a grille body 11 and an extension 12. The grille body 11 extends in the left-right direction. The grille body 11 is fitted into the grille hole (grille hole 42 in FIG. 5) of the bumper 40 (refer to FIG. 1). The extension 12 extends rearward and in the left-right direction and is located rearward from the grille body 11. The grille 10 is made of, for example, an elastic plastic.

The grille body 11 includes, for example, an upper support 11A, pillars 11B, ventilation holes 11C, a cover 11D, a lower support 11E, a groove 11F, and a lower end 11G. As shown in FIG. 5, the upper support 11A is in contact with the bumper 40 and is supported at a position corresponding to the upper end of the grille hole 42. Further, as shown in FIG. 5, the upper edge of the grille partition 41 is inserted into the groove 11F, which is located between the lower support 11E and the lower end 11G. The lower support 11E is in contact with the grille partition 41 and is supported at a position corresponding to the lower end of the grille hole 42.

As shown in FIG. 5, the ventilation holes 11C cause the vehicle interior and the vehicle exterior to communicate with each other. The ventilation holes 11C are defined in the left-right direction by the pillars 11B, which extend in the vertical direction. As shown in FIG. 5, the cover 11D covers part of the grille hole 42. For example, the opening area of each ventilation hole 11C is an area corresponding to the amount of air needed in the radiator. The portion corresponding to the area of the grille hole 42 unnecessary for the amount of air needed in the radiator is covered by the cover 11D.

When the vehicle interior is viewed from the vehicle exterior through the ventilation holes 11C, the extension 12 is located below the ventilation holes 11C so as to cover and hide the vehicle interior structure 50. More specifically, the ventilation holes 11C are defined between the upper support 11A and an extension front edge 12F, which is the front edge of the extension 12. The extension 12 covers and hides the vehicle interior structure 50 because the aesthetic appeal is lowered when the vehicle interior structure 50 is visible from the vehicle exterior through the ventilation holes 11C. Further, the extension 12 extends rearward and in the left-right direction. Thus, if no further developments are made, when the collision of the vehicle or the like causes the grille (10) to move rearward, an extension rear edge (12R), which is the rear edge of the extension (12), may strike the vehicle interior structure (50).

In the present embodiment, as shown in FIG. 5, the extension rear edge 12R of the extension 12 is located above a structure front upper edge 51, which is the front upper edge of the vehicle interior structure 50, so that the extension 12 does not strike the vehicle interior structure 50 even when the extension 12 is moved rearward. Further, the extension front edge 12F, which is the front edge of the extension 12, is located below the structure front upper edge 51 of the vehicle interior structure 50. The extension front edge 12F is a connection portion of the extension 12 at which the grille body 11 and the extension 12 are connected to each other.

As shown in FIG. 4, the extension 12 includes weak portions 13 that can divide the extension 12 into multiple sections in the left-right direction. That is, the small sections of the extension 12 that can be configured by the extension 12 are arranged in the left-right direction. The ventilation holes 11C of the grille body 11 are arranged in the left-right direction. Each pillar 11B extending in the vertical direction is arranged between ones of the ventilation holes 11C that are adjacent to each other in the left-right direction. The weak portions 13 are located rearward from the pillars 11B in the extension 12. FIG. 4 illustrates an example in which each weak portion 13 is formed for the corresponding pillar 11B. Instead, for example, the weak portion 13 may be formed for every other pillar 11B.

As shown in FIG. 5, the extension 12 is inclined upward from the extension front edge 12F toward the extension rear edge 12R. The example of FIG. 4 shows that the weak portions 13 are configured as cutouts and the cutouts (weak portion 13) extend frontward from the extension rear edge 12R of the extension 12. That is, FIG. 4 shows that the width of each cutout (the length of the vehicle in the left-right direction) is larger toward the extension rear edge 12R and smaller toward the front side of the vehicle.

Buffering of Impact (FIGS. 6 and 7) and Advantages of Present Embodiment

Figure 6:
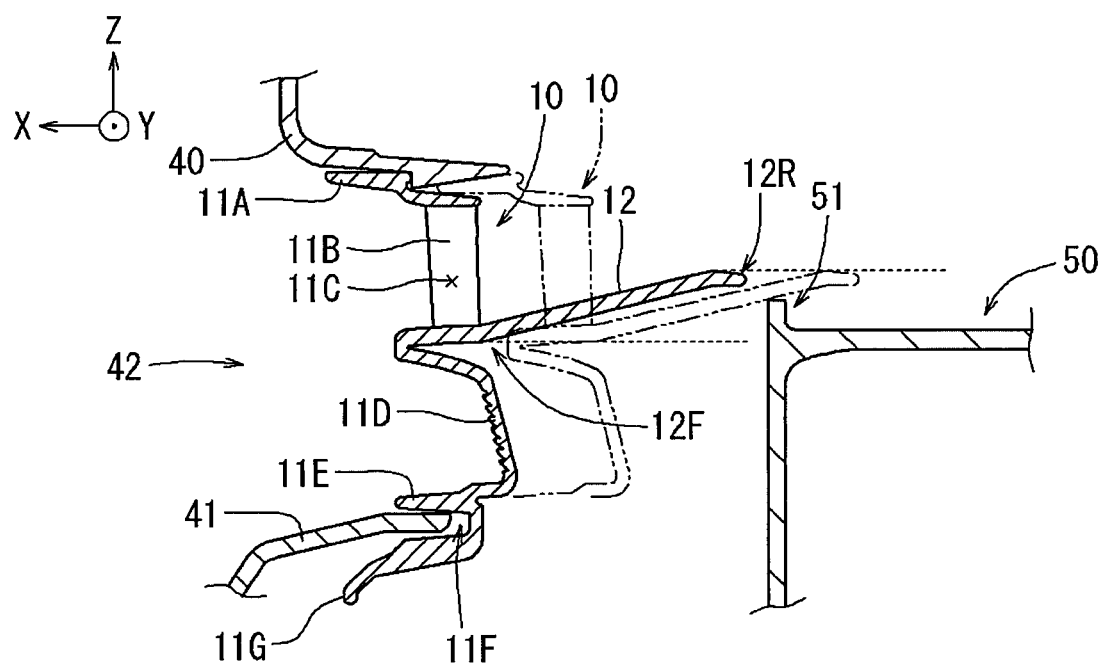
FIG. 6 is a diagram illustrating an example in which a collision or the like causes the grille to move from the state shown in FIG. 5 to the rear side so that an extension of the grille is in contact with the vehicle interior structure.
Figure 7:
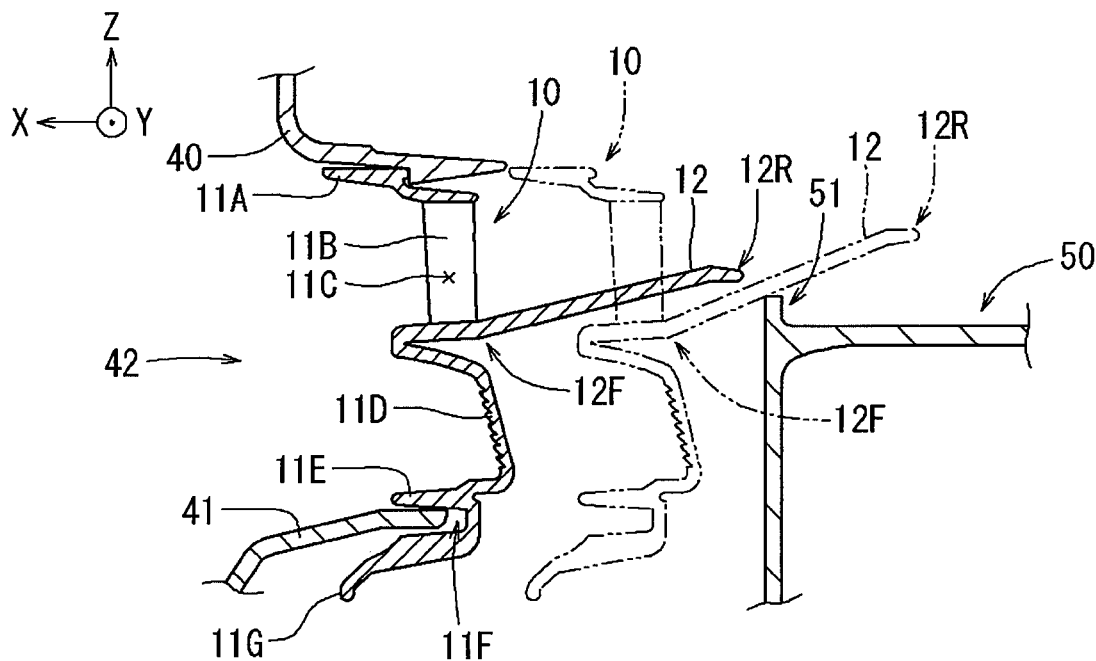
FIG. 7 is a diagram illustrating an example in which the grille is further moved from the state shown in FIG. 6 to the rear side so that the extension of the grille is deformed.

FIG. 6 illustrates an example in which a collision of the vehicle or the like causes the grille 10 to move from the state shown in FIG. 5 to the rear side so that the extension 12 of the grille 10 is in contact with the structure front upper edge 51 of the vehicle interior structure 50. FIG. 7 illustrates an example in which the grille 10 is further moved from the state shown in FIG. 6 to the rear side so that the extension 12 of the grille 10 is deformed.

As described above, the extension rear edge 12R is located above the structure front upper edge 51, and the extension front edge 12F is located below the structure front upper edge 51. Thus, when the grille 10 is moved rearward, the structure front upper edge 51 contacts the inclined surface of the extension 12 as shown in FIG. 6. Accordingly, the extension 12 never strikes the vehicle interior structure 50. That is, the striking of the extension rear edge 12R on the front surface of the vehicle interior structure 50 is avoided. When the grille 10 is further moved rearward, the extension 12 is deformed upward while keeping in contact with the structure front upper edge 51 as shown in FIG. 7. However, the extension 12 never strikes the vehicle interior structure 50. Accordingly, if the vehicle collides with a pedestrian or the like, the impact applied from the vehicle to the hit pedestrian can be further buffered.

As shown in FIG. 7, when the extension 12 is deformed upward while keeping in contact with the structure front upper edge 51, the extension 12 can be divided by the weak portions 13 (refer to FIG. 4). Thus, the amount of rearward movement of the extension 12 is large at portions of the extension 12 where a larger impact is applied. Accordingly, the impact is properly buffered. This is because if the vehicle collides with a pedestrian or the like, a larger amount of rearward movement of the grille further buffers the impact force on the pedestrian. In addition, the larger the amount of rearward movement of the grille 10, the closer to the vehicle interior structure 50 the grille 10 becomes. Accordingly, the deformation amount of the extension 12 becomes larger. That is, the closer to the vehicle interior structure 50 the grille 10 is, the larger the impact that can be absorbed becomes. Thus, it is further preferred that the weak portions 13 divide the extension 12. That is, since a force (impact) that further increases the deformation amount of the extension 12 is needed as the grille 10 approaches the vehicle interior structure 50, it is further preferred that the weak portions 13 divide the extension 12 in order to absorb the impact.

The weak portions 13 are located rearward from the pillars 11B. For example, as compared to when the weak portions 13 are located between the pillars 11B, the visibility of the weak portions 13 from the vehicle exterior is reduced in the present embodiment. Further, since the visibility of the vehicle interior structure 50 from the vehicle exterior through the weak portions 13 is reduced, the aesthetic appeal of the vehicle is improved. Further, the opposite ends of the small sections of the extension 12 in the left-right direction, which are configured by dividing the extension 12 by the weak portions 13, are properly supported by the pillars 11B.

Figure 8:
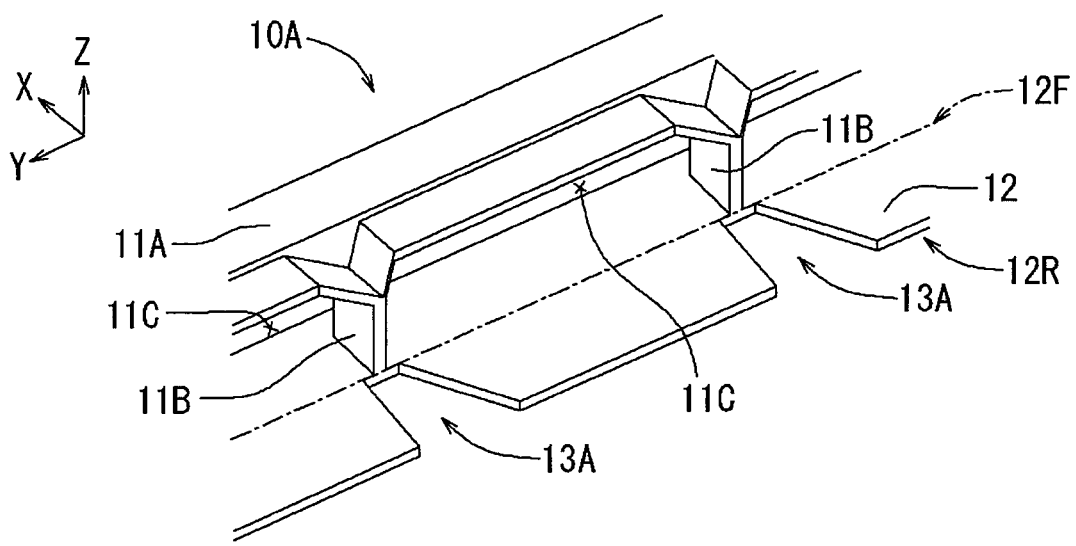
FIG. 8 is an enlarged view of region VIII in FIG. 4, illustrating an example (example 1) of weak portions.
Figure 9:
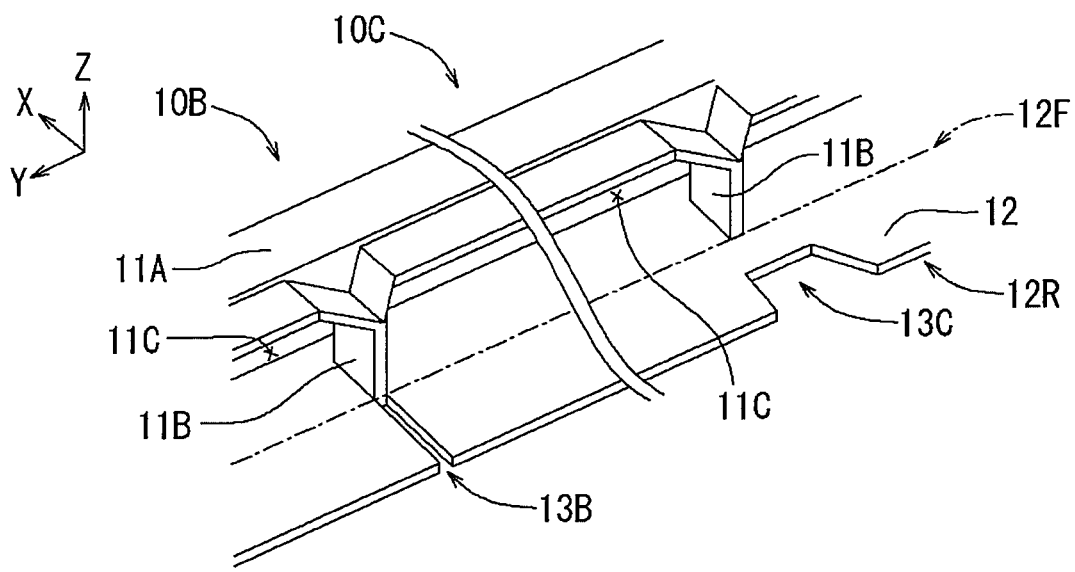
FIG. 9 is a perspective view illustrating other examples (examples 2 and 3) of the weak portions.
Figure 10:
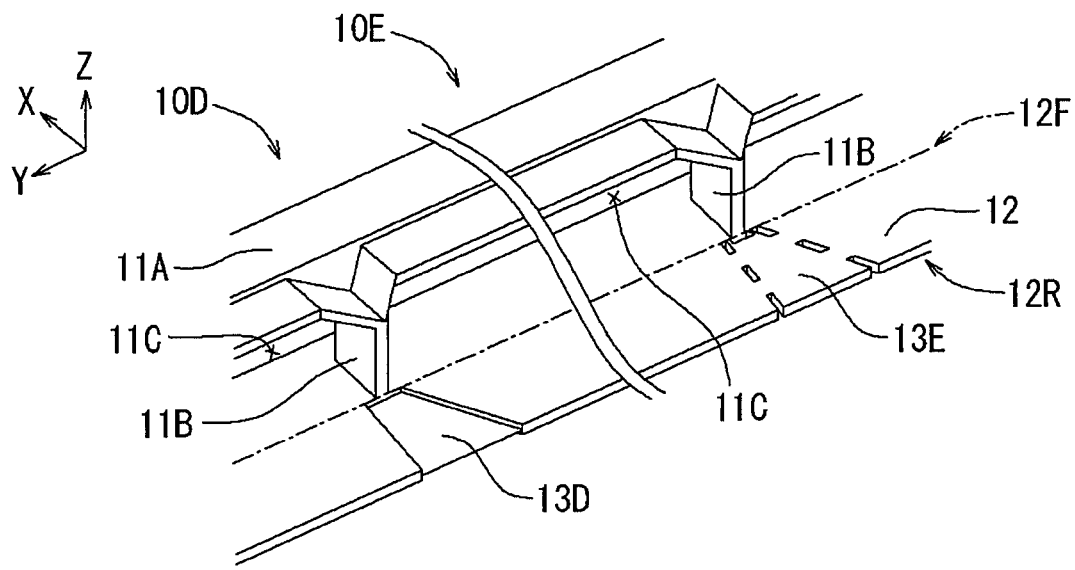
FIG. 10 is a perspective view illustrating further examples (examples 4 and 5) of the weak portions.

Examples of Weak Portions at Extension of Grille (FIGS. 8 to 10)

In the following description, FIGS. 8 to 10 are used to illustrate various examples of the weak portions. The weak portions are all located rearward from the pillars 11B. FIG. 8 shows weak portions 13A serving as a first example. In this example, each weak portion 13A is configured by a cutout. In the example of FIG. 8, relatively wide cutouts are formed frontward from the extension rear edge 12R toward positions proximate to the pillars 11B. FIG. 9 shows a weak portion 13B that serves as a second example configured by a cutout. The cutout of the weak portion 13B has a smaller width than that of the weak portion 13A shown in FIG. 8. FIG. 9 also shows a weak portion 13C that serves as a third example configured by a cutout. The cutout of the weak portion 13C has a smaller length in the front-to-rear direction than that of the weak portion 13A shown in FIG. 8. When the weak portion is configured by a cutout as shown in FIGS. 8 and 9, the weak portion can be manufactured relatively easily. Further, the cutout can be formed into various shapes so that the impact force is buffered in a desired manner.

FIG. 10 shows a weak portion 13D serving as a fourth example configured by a thin portion. The weak portion 13D is different from a cutout devoid of a body in that the weak portion 13D has a thin body. This prevents the vehicle interior structure 50 from being viewed from the vehicle exterior through the weak portion 13D. Thus, the aesthetic appeal is further improved.

FIG. 10 also shows a weak portion 13E serving as a fifth example in which a non-continuous slit surrounds the contour of the weak portion 13E. The weak portion 13E is different from a cutout devoid of a body in that the weak portion 13E has a body surrounded by the slit. This prevents the vehicle interior structure 50 from being viewed from the vehicle exterior through the weak portion 13E. Thus, the aesthetic appeal is further improved.

The grille peripheral structure for the vehicle in the present disclosure is not limited to the arrangement, structure, shapes, and the like illustrated in the present embodiment. Various modification, addition, and deletion can be performed within the scope of not changing the abstract of the present disclosure. In addition, the shapes, structures, and the like of the weak portions are not limited to those illustrated in the present embodiment. The weak portions can have various shapes and structures. Each of the embodiments and each of the modifications can be rearranged so as not to be contradictory to each other. For example, in the present embodiment, the extension 12 is inclined straight upward from the extension front edge 12F toward the extension rear edge 12R. Instead, the extension 12 may be bent or curved upward halfway so that the inclination angle of a part of the extension 12 with respect to the front-to-rear direction is larger at a rear portion closer to the extension rear edge 12R than at a front portion closer to the extension front edge 12F. In this case, the arrangement flexibility increases depending on the space or the like in the vehicle. Further, changing the inclination angle of the extension 12 halfway causes a portion of the extension 12 located away from the ventilation holes 11C to be arranged further upward. This allows wind to be drawn in from the ventilation holes 11C.

Therefore, the present examples and embodiments are to be considered as illustrative and not restrictive and the disclosure is not to be limited to the details given herein, but may be modified within the scope and equivalence of the appended claims.

The invention claimed is:

1. A grille peripheral structure for a vehicle, the grille peripheral structure comprising:
    a bumper arranged at a front end of the vehicle, wherein the bumper has a grille hole that causes an exterior and an engine room of the vehicle to communicate with each other and extends in a left-right direction of the vehicle;
    a grille fitted into the grille hole; and
    a vehicle engine room structure arranged rearward from the grille in the vehicle, wherein
    the grille includes a grille body and an extension,
    the grille body extends in the left-right direction and is fitted into the grille hole, wherein the grille body has a ventilation hole that causes the exterior and the engine room of the vehicle to communicate with each other,
    the extension extends rearward and in the left-right direction, wherein the extension is located rearward from the grille body and below the ventilation hole,
    an extension rear edge that is a rear edge of the extension is arranged above a structure front upper edge that is a front upper edge of the vehicle engine room structure,
    an extension front edge that is a front edge of the extension and at which the grille body and the extension are connected to each other is arranged below the structure front upper edge,
    the extension is inclined from the extension front edge toward the extension rear edge, and
    the extension includes weak portions that divide the extension into a plurality of sections in the left-right direction.

2. The grille peripheral structure according to claim 1, wherein
    the ventilation hole of the grille body is one of a plurality of ventilation holes arranged along the left-right direction,
    a pillar extending in a vertical direction of the vehicle is arranged between ones of the ventilation holes that are adjacent to each other in the left-right direction, and
    the weak portions are located rearward from the pillars in the extension.

3. The grille peripheral structure according to claim 1, wherein the extension is bent or curved upward from the extension front edge toward the extension rear edge.

4. The grille peripheral structure according to claim 1, wherein the weak portions are configured by cutouts.

5. A grille for a vehicle, the grille being coupled to a bumper of the vehicle, a vehicle engine room structure being arranged rearward from the grille in the vehicle, the grille comprising:
  a ventilation hole that causes an exterior and an engine room of the vehicle to communicate with each other; and
  an extension, wherein
    when the engine room of the vehicle is viewed from the exterior of the vehicle through the ventilation hole, the extension extends rearward so as to hide the engine room of the vehicle, and
    the extension extends upward above the vehicle engine room structure, and
  an extension rear edge that is a rear edge of the extension is arranged above a structure front upper edge that is a front upper edge of the vehicle engine room structure.

6. The grille according to claim 5, wherein the extension includes weak portions that divide the extension into a plurality of sections in a left-right direction of the vehicle.

7. A method for manufacturing a grille peripheral structure for a vehicle, wherein a bumper being arranged at a front end of the vehicle, the bumper having a grille hole that causes an exterior and an engine room of the vehicle to communicate with each other and extends in a left-right direction of the vehicle, the method comprising:
  providing a grille that includes a grille body and an extension; and
  coupling the grille to the grille hole,
  the providing the grille includes
    extending the grille body in the left-right direction,
    arranging a ventilation hole in the grille body, wherein the ventilation hole causes the exterior and the engine room of the vehicle to communicate with each other,
    extending the extension rearward and in the left-right direction,
    arranging the extension rearward from the grille body and below the ventilation hole,
    inclining the extension from an extension front edge toward an extension rear edge, wherein the extension front edge is a front edge of the extension and at which the grille body and the extension are connected to each other, and the extension rear edge is a rear edge of the extension, and
    arranging weak portions in the extension, wherein the weak portions divide the extension into a plurality of sections in the left-right direction,
  a vehicle engine room structure is arranged rearward from the grille in the vehicle, and
  the coupling the grille to the grille hole includes
    fitting the grille body into the grille hole,
    arranging the extension rear edge above a structure front upper edge that is a front upper edge of the vehicle engine room structure, and
    arranging the extension front edge below the structure front upper edge.

* * * * *